Patented June 2, 1936

2,042,485

UNITED STATES PATENT OFFICE 2,042,485

LAMINATED SAFETY GLASS ADHESIVE AND METHOD OF PREPARING SAME

Joseph D. Ryan and George B. Watkins, Toledo, Ohio, assignors to Libbey-Owens-Ford Glass Company, Toledo, Ohio, a corporation of Ohio No Drawing. Application August 27, 1934, Serial No. 741,728

11 Claims. (Cl. 49—81)

The present invention relates to laminated safety glass and more particularly to adhesives and methods of preparing the same for use in the manufacture of laminated safety glass.

Laminated safety glass is a composited structure ordinarily composed of two sheets of glass and an interposed layer of tough, transparent plastic material adherent to the inner surfaces thereof. It has been the general practice to coat either the inner surfaces of the glass sheets, both surfaces of the plastic layer, or the surfaces of both the glass and plastic with some suitable adhesive or other bonding medium prior to arrangement of the laminations in sandwich form. After assembly, the sandwich so formed has been subjected to the combined action of heat and pressure to get the necessary bond between the laminations.

It has been customary to employ cellulose derivative plastics as the intermediate layer in the commercial production of laminated safety glass and, in addition, some attempts have been made to commercialize the use of synthetic resins for this purpose. Laminated safety glass has found wide use in vehicles so that in normal use the glass is subjected alternately to summer's heat and winter's cold, and to be commercially satisfactory the bond between the laminations must not be noticeably adversely affected by change in temperature over a period of years.

Considerable research and development work has been carried on in both the laminated safety glass and plastic arts to produce plastics possessing sufficient strength, clarity, and stability to heat and light energy for use in the making of laminated safety glass. In the past few years material headway has been made but even after the plastics themselves are produced, the problem of bonding the plastic to the glass sheets still remains.

Broadly, it may be stated that the various plastics materials available on the open market today do not possess the characteristics of adherence toward glass surfaces even when subjected to heat and pressure treatment.

When stating that such plastics are not adherent to the glass surfaces, it is not necessarily meant that there is a total absence of adherent characteristics, although this may be true in many cases, but rather it is meant that it is impossible to bond the plastic and glass surfaces together to produce laminated safety glass suitable for commercial uses. The bond required is such that the laminations will not separate in whole or in part for a period of years when subjected to the normal temperature conditions ordinarily encountered in use. To be satisfactory, laminated glass must be such that when the glass is broken as by an impact, the fragments so formed will remain adherent to the plastic layer and this whether the glass is broken at elevated temperatures, for example, 100° F., or at the lower temperatures, for example, 0° F.

Therefore, a plastic sheet, even though it possesses excellent strength, clarity, and stability toward light and heat energy is of no value in the laminated safety glass art unless it can be permanently bonded to glass surfaces, the bond being independent of temperature and capable of giving service for a period of years.

The present invention relates broadly to a process wherein a satisfactory adhesive can be made for cellulose derivative plastics, synthetic resin plastics, or plastics comprising mixtures of synthetic resins and cellulose derivatives. We have discovered as a result of innumerable experiments with various types of cellulose derivative plastics and synthetic resin plastics that we can produce an adhesive for any given cellulose derivative plastic or synthetic resin plastic which in itself lacks the property of adherence toward glass.

We do not prepare a single adhesive that will work with all of the various plastics but use the same principle in preparing an individual adhesive for each of the various cellulose derivative plastics and synthetic resin plastics. Experience has shown, for example, that an adhesive which will work for cellulose acetate plastic and glass will not be suitable for cellulose acetate butyrate plastic and glass or any of the other cellulose derivative plastics and of course the converse is true.

To show the magnitude of the problem, cellulose acetate plastic, even though possessing known advantages over pyroxylin plastic, and notwithstanding the fact that it has been available on the market for a number of years, has been used in the manufacture of laminated safety glass for a relatively very short period because it was not known how to satisfactorily bond the cellulose acetate plastic to glass in such a way that the composited structure would give satisfactory service. It will therefore be obvious that the problem of bonding any given cellulose derivative plastic or synthetic resin plastic has heretofore presented its own individual problem.

Basically, our invention consists in taking some of the base or raw stock material of any given cellulose derivative plastic or resin plastic and subjecting such unplasticized base material to a rather severe chemical treatment which changes the characteristics of the base material similar to that used in the preparation of the plastic layer itself so that upon proper plasticization of the chemically treated base material, an adhesive is produced which can be used to give a satisfactory bond between the plastic sheet and the glass sheets.

The chemical treatment is resorted to to increase the polar groups of the base material and, as will be appreciated from the examples to follow, the chemical treatments suggested increase the polar groups of the base material, and we believe that it depends upon the particular chemical treatment employed as to whether the polar groups are increased as a result of hydrolysis, a result of oxidation, or as a result of a combination of both oxidation and hydrolysis.

Our invention is not specific to any one particular way of chemically treating the base materials. Rather, the invention relates broadly to any treatment of the unplasticized base or raw stock material whereby the polar groups thereof are increased sufficiently that when plasticized and dispersed in suitable solvents to permit application thereof to the laminations, the resulting adhesive will have adherent properties not only toward the glass but also toward the plastic sheet for which the adhesive has been produced. When subjecting the base material to the chemical treatment to increase the polar groups, a sufficient increase in polar groups is required to render the adhesive subsequently produced adherent toward the glass, but the base material should not be completely hydrolyzed or completely oxidized. By only partially hydrolyzing or partially oxidizing the base material, the said base material remains compatible with the plastic sheet to be bonded to the glass and therefore proper adhesion is obtained between the various laminations. Should either the hydrolysis or oxidation of the base material be complete, the adhesive formed therefrom would not be compatible with the plastic sheet and improper adhesion would result.

Naturally, the amount of polar group increase required will depend upon the base material being treated which in turn depends upon the plastic sheet to be bonded to the glass. However, it can be readily determined when the polar group increase is sufficient by making sample adhesives and experimental sheets of laminated safety glass. If an adequate bond is not obtained, the polar group increase has been insufficient and further treatment of the unplasticized base material is required. However, once it has been determined at just what point it is best to arrest the chemical treatment or reaction of the base material to give the desired adhesive, subsequent batches of adhesive can be made without the trial method used in making the first determination.

In general, the polar groups that are increased or even added to the base material are the carboxyl group; hydroxyl group; aldehyde group; and keto group. For example, we have made adhesives for certain cellulose ester plastics, such as cellulose acetate plastic, cellulose aceto butyrate plastic, cellulose propionate plastic, etc. by increasing the polar groups of the base materials of said plastics by subjecting from 25% to 50% of the base material used in making up the plastic to a hydrolytic treatment by subjecting the raw cellulose derivatives to the prolonged action of various water solutions of acids and alkalies. It may be mentioned that oxidizing agents can also be used and if they are used, we believe that oxidation takes place as well as hydrolysis.

It is thought to be clear that in making an adhesive for cellulose acetate plastic, raw cellulose acetate is the base material for that plastic only and that when making adhesives for the other plastic, the raw cellulose derivative base used in each of the various plastics constitutes the base material for its own plastic only.

In the making of adhesives for other types of cellulose derivative plastics such as the cellulose ether plastics including ethyl cellulose, benzyl cellulose, propyl cellulose, etc., we have found that the polar groups of the base materials can be effectively increased by subjecting them before plasticization to a treatment which is essentially oxidizing in character.

Thus, in the production of an adhesive for ethyl cellulose plastic, some of the unplasticized ethyl cellulose is subjected to the action of an oxidizing agent such as bleaching powder, chlorine, bromine, dilute nitric acid, potassium chlorate and hydrochloric acid, chromic acid, sodium hydroxide and air, potassium or sodium dichromate and sulfuric acid, as well as potassium permanganate. The reaction time, temperature, and concentration of reactants are varied or are dependent upon the power of oxidizing agent selected as well as the particular ethyl cellulose to be oxidized.

One formula that can be used in the oxidation of the ethyl cellulose comprises employment of potassium permanganate. 10 grams of ethyl cellulose may be suspended in a solution of 5 grams of potassium permanganate dissolved in 500 c.c. of water. This mixture can then be heated over a steam bath until the purple permanganate color has been replaced by the brownish color characteristic of manganese dioxide. The time for reaction is usually a few hours and the mixture, after reaction, can be treated in several ways to recover the oxidized ethyl ether of cellulose.

In one method of recovery, the reaction mass may be filtered, air dried, and extracted with a suitable solvent for the oxidized ethyl cellulose which is a non-solvent for manganese dioxide.

This chemical treatment of the base material (the unplasticized ethyl cellulose) increases its polar groups by oxidation. We believe, however, that this treatment not only increases the polar groups of the base material by oxidation but that undoubtedly hydrolysis also plays an important part in view of the fact that when cellulose derivatives are subjected to water solutions at elevated temperatures, they undergo a certain hydrolytic action.

The next step in preparing the oxidized ethyl cellulose as an adhesive is to dissolve it in a suitable solvent or mixtures of solvents so that it can be applied to the laminations to be bonded by any of the methods well known in the art. Excellent results are obtained when plasticizers for ethyl cellulose such as the phthalate esters are incorporated with the oxidized cellulose solution, although we have obtained good results in the bonding of ethyl cellulose plastic and glass with the oxidized ethyl cellulose solution even when the plasticizers are not included in the adhesive film.

Solvents may also be added, the addition and amount and kind of solvents being dependent upon the manner in which the adhesive is to be applied to the laminations. The adhesive can be made rather dilute and sprayed on the laminations or can be applied in a thicker state by means of film rolls or the like.

The adhesive may be applied to either the glass or ethyl cellulose plastic laminations and, after arrangement in proper superimposed relationship, the sandwich so formed may be subjected to the combined action of heat and pressure. It will be found that whereas the ordinary ethyl cellulose plastic sheet cannot be directly bonded to glass surfaces, with the use of the adhesive including the chemically treated base material, excellent adhesion is obtained between the ethyl cellulose plastic sheet and the glass through the intermediary of the adhesive coating. As previously stated, the chemical treatment of the base material should not be carried to the point where the base material becomes incompatible with the plastic sheet.

The production of an adhesive for cellulose acetate plastic can be cited as an example of treating the base material primarily by hydrolysis to give a satisfactory adhesive.

A commercially satisfactory adhesive can be made by introducing 50 parts of cellulose acetate into 834 parts of water together with 7 parts of concentrated C. P. hydrochloric acid and 11 parts of 75% ortho-phosphoric acid. This mixture is then heated and allowed to react while being rapidly agitated at a temperature of about 195 to 208 degrees Fahrenheit for a period of approximately two hours.

The reaction product thus formed is then washed substantially free from the acid solution and dried in an oven at a temperature of approximately 200 to 212 degrees Fahrenheit for about fifteen hours. The reaction product may then be dissolved or dispersed in suitable high boiling point, low vapor pressure solvents and plasticizers which will give an excellent adhesive for cellulose acetate plastic and glass laminations. For example, dimethyl phthalate, diethyl phthalate, triacetin, ethyl lactate, benzyl alcohol, benzyl acetate, or various combinations or mixtures of these plasticizers and solvents can be used.

In addition to the cellulose derivative plastics, adhesives can be produced for the synthetic resins by following the same principle, namely, the chemical treatment of some of the base material of the plastic sheet to be bonded to the glass sheets in such a way that the polar groups of the base material are increased sufficiently to transform the material from one lacking adherence toward glass to one having adherent characteristics toward glass. As in the case with the cellulose derivatives, it depends upon the type of resin material used as the base material as to just the exact chemical reaction required to bring about the necessary increase of polar groups.

We have found, for example, that with acrylic acid ester type resins, the acrylic acid resin base can be subjected to a prolonged hydrolytic action employing mineral acids in the proper concentration. Similarly, this same general type of reaction is used to produce the desired results in the case of the vinyl ester resins.

In this instance, some of the base material is subjected to a chemical action which we believe to be essentially hydrolysis, carefully controlling and arresting the hydrolytic action at the point where the reacted material is still compatible with the resinous plastic layer but likewise is so modified in character that it will adhere to glass surfaces.

To produce an adhesive capable of serving as an adhesive between glass and a layer of resin formed from a co-polymerized mixture of vinyl acetate and vinyl chloride, approximately 20 grams of the co-polymerized mixture of vinyl acetate and vinyl chloride can be dissolved in about 400 c. c. of commercial acetone to facilitate chemical reaction. To this solution may be added 100 c. c. of an acid solution prepared by diluting 25 c. c. of concentrated hydrochloric acid with 75 c. c. of commercial acetone.

This mixture is then refluxed on a steam bath. After the reaction period, the mixture is cooled and poured into water while being vigorously stirred. Under such circumstances, the resin precipitates and it may then be washed free of acid and dried. The dried resin mass may then be dissolved in acetone and a plasticizer such as butyl salicylate and phthalate esters. This constitutes the adhesive which is applied to the laminations to be bonded together.

Based upon the many adhesives produced and tried as exemplified above, we are of the opinion that we can produce satisfactory adhesives for all types of plastics either of the cellulose derivative or the resin type by subjecting some of the unplasticized base material of the plastic to be joined to the glass to a proper chemical treatment to increase its polar groups, the chemical treatment being terminated while the base material still remains compatible with the plastic layer and then dispersing the chemically treated base material in suitable solvents and plasticizers to permit application thereof to the laminations to be bonded together. Every adhesive that we have made in this way up to the present time has been outstandingly successful and in all cases we attribute our success to the increase of the polar groups of the base material to change the base material from a substance lacking in adherence toward glass surfaces so that it has the new property of adherent characteristics toward glass.

The degree of polar group increase required naturally depends upon the particular material to be treated but in all cases it is essential that the chemically treated base material remain compatible with the plastic which means that in increasing the polar groups, the base material cannot be completely hydrolyzed or completely oxidized and still remain compatible with untreated base material or plastic made therefrom.

The examples set forth above are by way of illustration only to show some of the various types of treatment that can be used to increase the polar groups of the base materials used in the making of the adhesives. The list of examples is not intended to be complete, as those versed in the art of plastic manufacture will, with the above, be able to select for any given plastic and base material thereof a satisfactory method of chemical treatment to increase the polar groups. It will likewise be understood that the chemical treatment is given to unplasticized base material and that the base material is not dispersed in plasticizers until after the polar groups have been increased.

In some cases it may not be necessary to chemically treat all of the base material used in producing the adhesive and here again the amount of base material required to be treated and the extent of treatment necessary will depend upon the particular plastic and base material.

We claim:

1. Laminated safety glass comprising two sheets of glass and an interposed layer of transparent plastic material, which in itself lacks adherence toward glass, bonded to said glass sheets with an adhesive containing some of the base material of said plastic layer which has been chemically treated to increase its polar groups sufficiently to render it, when plasticized, adherent toward glass surfaces upon the application of heat and pressure.

2. Laminated safety glass comprising two sheets of glass and an interposed layer of transparent plastic material, which in itself lacks adherence toward glass, bonded to said glass sheets with an adhesive containing some of the base material of said plastic layer, a portion at least of which has been chemically treated to increase its polar groups sufficiently to render it, when plasticized, adherent toward glass surfaces, said chemically treated base material being compatible with similar untreated base material.

3. Laminated safety glass comprising two sheets of glass and an interposed layer of a type of transparent cellulose derivative plastic material, which in itself lacks adherence toward glass, bonded to said glass sheets with an adhesive containing some of the base material of said cellulose derivative plastic layer which has been chemically treated to increase its polar groups sufficiently to render it, when plasticized, adherent toward glass surfaces upon the application of heat and pressure.

4. Laminated safety glass comprising two sheets of glass and an interposed layer of a type of transparent synthetic resin plastic material, which in itself lacks adherence toward glass, bonded to said glass sheets with an adhesive containing some of the base material of said synthetic resin plastic layer which has been chemically treated to increase its polar groups sufficiently to render it, when plasticized, adherent toward glass surfaces upon the application of heat and pressure.

5. Laminated safety glass comprising two sheets of glass and an interposed layer of transparent plastic material, which in itself lacks adherence toward glass, bonded to said glass sheets with an adhesive containing some of the base material of said plastic layer, a portion at least of which has been partially hydrolyzed to increase its polar groups sufficiently to render it, when plasticized, adherent toward glass surfaces upon the application of heat and pressure.

6. Laminated safety glass comprising two sheets of glass and an interposed layer of transparent plastic material, which in itself lacks adherence toward glass, bonded to said glass sheets with an adhesive containing some of the base material of said plastic layer, a portion at least of which has been partially oxidized to increase its polar groups sufficiently to render it, when plasticized, adherent toward glass surfaces upon the application of heat and pressure.

7. Laminated safety glass comprising two sheets of glass and in interposed layer of transparent plastic material, which in itself lacks adherence toward glass, bonded to said glass sheets with an adhesive containing some of the base material of said plastic layer, a portion at least of which has been chemically treated to increase its polar groups by hydrolysis and oxidation sufficiently to render it, when plasticized, adherent toward glass surfaces upon the application of heat and pressure.

8. The process of producing laminated safety glass comprising two sheets of glass and an interposed layer of transparent plastic material which in itself lacks adherence toward glass, consisting in chemically treating some of the base material of said plastic layer to increase its polar groups, then plasticizing said chemically treated base material, applying the adhesive thereby formed to the laminations, arranging the layer of transparent plastic material between the glass sheets, and subjecting the sandwich thus formed to heat and pressure.

9. The process of producing laminated safety glass comprising two sheets of glass and an interposed layer of transparent plastic material which in itself lacks adherence toward glass, consisting in subjecting some of the base material of said plastic to a hydrolytic action to increase its polar groups, then plasticizing said hydrolyzed base material, applying the adhesive thereby formed to the laminations, arranging the layer of transparent plastic material between the glass sheets, and subjecting the sandwich thus formed to heat and pressure.

10. The process of producing laminated safety glass comprising two sheets of glass and an interposed layer of transparent plastic material which in itself lacks adherence toward glass, consisting in subjecting some of the base material of said plastic to an oxidizing treatment to increase its polar groups, then plasticizing said oxidized base material, applying the adhesive thereby formed to the laminations, arranging the layer of transparent plastic material between the glass sheets, and subjecting the sandwich thus formed to heat and pressure.

11. The process of producing laminated safety glass comprising two sheets of glass and an interposed layer of transparent plastic material which in itself lacks adherence toward glass, consisting in subjecting some of the base material to a combined hydrolyzing and oxidizing treatment, then plasticizing said treated base material, applying the adhesive thereby formed to the laminations, arranging the layer of transparent plastic material between the glass sheets, and subjecting the sandwich thus formed to heat and pressure.

JOSEPH D. RYAN.
GEORGE B. WATKINS.